Figure 1:
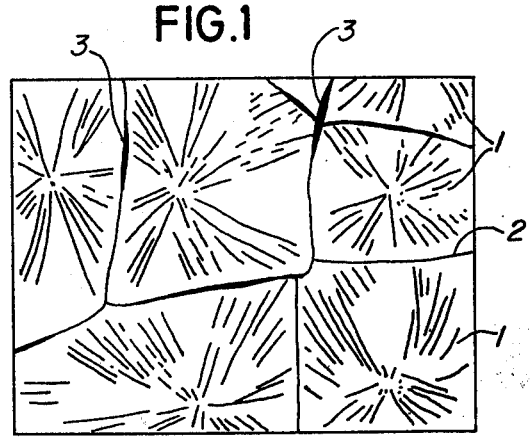

United States Patent [19]

Soder

[11] 4,127,554
[45] Nov. 28, 1978

[54] METHOD OF MANUFACTURE, BY MEANS OF THERMOPLASTIC MOULDING, OF ELEMENTS MADE OF CRYSTALLIZABLE PLASTIC MATERIAL WITH A STRENGTHENING LOAD

[75] Inventor: Robert Soder, Montreux-Territet, Switzerland

[73] Assignee: Ebauches S.A., Neuchatel, Switzerland

[21] Appl. No.: 706,393

[22] Filed: Jul. 19, 1976

[30] Foreign Application Priority Data

Aug. 11, 1975 [CH] Switzerland ............... 10421/75

[51] Int. Cl.² ............... C08L 77/00; C08L 71/02
[52] U.S. Cl. ............... 260/37 N; 260/37 R; 260/37 AL; 260/37 PC; 260/40 R; 260/42.46
[58] Field of Search ........... 260/37 N, 37 PC, 37 AL, 260/40 R

[56] References Cited

U.S. PATENT DOCUMENTS

| | | | |
|---|---|---|---|
| 3,214,414 | 10/1965 | Waltersperger | 260/37 N X |
| 3,549,651 | 12/1970 | Oswald et al. | 260/37 N X |
| 3,663,499 | 5/1972 | Brinkmann | 260/40 R |
| 3,704,275 | 11/1972 | Burg et al. | 260/37 AL |
| 3,755,221 | 8/1973 | Hitch | 260/37 N X |
| 3,767,610 | 10/1973 | Burg et al. | 260/37 AL |
| 3,830,777 | 8/1974 | Burton | 260/37 N |
| 3,876,608 | 4/1975 | Anderson et al. | 260/40 R |
| 3,884,870 | 5/1975 | Dodson et al. | 260/40 R |
| 3,889,039 | 6/1975 | Wainer | 260/40 R X |
| 3,907,581 | 9/1975 | Wilcox | 260/40 R X |

OTHER PUBLICATIONS

Jenkins: Polymer Science, PT. I, North-Holland Pub. Co., pp. 254-267, 275-277, 287-292, 1972.

Primary Examiner—Lewis T. Jacobs
Attorney, Agent, or Firm—Silverman, Cass & Singer, Ltd.

[57] ABSTRACT

A method for manufacturing molded thermoplastic products formed of crystallizable plastic material containing reinforcing elements. The reinforcing elements are added to the molten thermoplastic material and are capable of being moved by the front of recrystallization during growth of the crystallites in the thermoplastic material so that the reinforcing elements are disposed in the interspherulitic zones between crystallites when the crystals have been fully grown. The reinforcing elements are selected so that they have dimensions smaller than the dimensions of the crystallites of thermoplastic material, they are present in an amount of 0.05 to 5% by weight based on the thermoplastic material and they have a shape favorable to the transfer of mechanical stresses and, in addition, the boundary of the reinforcing element particles is sufficiently defined so that the particles can be moved by the growing front of recrystallization of the spherulites. The reinforcing elements may be insoluble in the molten semi-plastic material. The reinforcing particles may be preferentially crystallized from the molten thermoplastic material if soluble or partially soluble therein or, may be grown on a supporting material insoluble in the molten plastic.

4 Claims, 2 Drawing Figures

METHOD OF MANUFACTURE, BY MEANS OF THERMOPLASTIC MOULDING, OF ELEMENTS MADE OF CRYSTALLIZABLE PLASTIC MATERIAL WITH A STRENGTHENING LOAD

The present invention relates to a method of manufacture, by means of thermoplastic moulding, of elements made of crystallizable plastic material containing a reinforcing material as a strengthening load.

The addition of short strengthening fibers of glass to improve the mechanical properties thereof is widely used. These materials are used in injection molding operations or in other thermoplastic molding methods. The fibers substantially increase the mechanical strength by distributing the stresses over a wide area. They constitute elements of higher strength than the strength of the basis thermoplastic material. The degree of strength which can be obtained depends from several factors:

Firstly of the strength of the reinforcing fibers, of their percentage in volume, their surface contact, their uniformity, their condition dispersion, the ratio between their length and their diameter and, especially, the values of adhesion between the fibers and the thermoplastic material.

The optimum concentration and length of the fibers are a compromise between the desired quality of the molded product and the injectability of the reinforced thermoplastic material. An increase in the concentration and the length of the fibers leads to a reduction in the fluidity of the material during the injection (i.e. increases of the melt index). In order to maintain the fluidity so as to provide for a correct molding of material, it is necessary in such cases to increase the molding temperature. However, any increase in the temperature accelerates the degradation and transformation of the thermoplastic material and reduces the quality of the molded products.

The fibrous reinforcing elements produce, especially in molded products of complex shape, produce non-homogeneous zones in the materials due to the fact that, during the filling of the mold in the course of the injection process, the flux of the molten material orients the fibers in the direction of the flux of the mass. As a result the reinforcing or strengthening fibers prevent the molten plastic material from flowing freely and uniformly into the feeding pipes and in the cavity of the mold.

Tangles of glass fibers also constitute an obstacle to the flow of the plastic material. In the zones of backflow, the fibers tangle more easily and their concentration in such zones will increase with a consequent depletion in adjacent zones.

These non-homogeneities produce zones of differing mechanical strength and thus dimensional stability of the injected product. The ability to obtain precision is consequently limited by the extent of these non-homogeneities.

As a solution to the problem of non-homogeneities, attempts have been made to use very short fibers or to replace them by microballs of glass. The reinforcing effect of the balls is not as high as that obtained by means of fibrous materials, but the formation of non-homogeneities is considerably reduced and the flow of the molten material is improved substantially due to the shape of these balls which allows them to rotate freely in the molten material.

For molding a precision product having a high mechanical strength and good dimensional stability, a thermoplastic material such as, for example, a polyamide, polyolefin, polyacetal, polyterephthalate, polyphenyleneoxide, polyphenylene sulfide, etc., should be employed. All these high strength plastic materials have a pronounced crystallinity. Accurate adjustment of the injecting machine is necessary to promote the formation of a crystalline structure uniformly distributed throughout the whole product. A structure of relatively large spherulites, of regular dimension, improves the dimensional stability, the hardness and the friction properties, but reduces the flow, the wear and the water absorption properties of the structure. By maintaining the mold at a high temperature, it is possible substantially to reduce the thermal gradient between the molten material and the solidifying material in the mold facilities the development of the desired structure.

All the thermoplastic materials mentioned are available with addition of glass fibers in proportion of 20 to 40% by weight. The fibers substantially improve the mechanical qualities of the molded products and thus it may not always be necessary ro optimize the molding conditions in order to influence the formation of the crystalline structure. The glass fibers have no influence on the crystallization, apart from the production of a slight increase in the thermal conductivity.

A comparison of the dimensions of the spherulitic particles of the thermoplastic material (about 10 to 50$\mu$) with the dimensions of the glass fibers (about 100 to 600$\mu$ in length and 30 to 150$\mu$ in diameter), indicates that these fibres are very rough. The position of the glass fibers in the thermoplastic material remains independent of the spherulitic structure and thus reinforcement is independent from the crystallinity of the thermoplastic material.

The method according to the invention is characterized by the fact that the reinforcing elements are placed in the zone of contact of the crystallites of the plastic material when the crystallites of this material have reached their maximum (see source) size at the end of the crystallization. The reinforcing material has the following characteristics:

a — it is capable of being moved by the front of recrystallization during growth in the crystallites of the thermoplastic material.

b — its dimensions are smaller than the dimensions of the crystallites of the plastic material.

c — it is present in proportion of 0.05 to 5% with respect to the weight of the thermoplastic material.

d — it has a shape favourable to transfer of mechanical stresses.

e — its melting and recrystallization temperatures are higher than the unmoulding temperature.

In the present invention, the reinforcement is located at the level of the crystalline structure of the plastic material. It has been found that reinforcing elements of very small dimensions, for example at least 5 to 10 times smaller than the diameter of the spherulitic particles at their maximum size, which are present in low proportion, for example 0,05 to 1% by weight of the plastic material, are displaced and oriented during the growing of these particles. The growing crystalline front repels these reinforcing elements into the liquid phase and, at the end of crystallization, when the solidification is complete, these elements are imprisoned in the interspherulitic zones between the spherulitic particles. This phenomena is known and used as a purification technique to eliminate impurities at the molecular level from a molten zone.

In the zone surrounding the spherulitic particles, the thermoplastic material of low molecular weight and the thermoplastic material in the amorphous condition also are concentrated as well as impurities and a portion of the additives, pigments and colourings which are present. The presence of reinforcing elements having the shape of very sharp crystalline fibers or needles in these interspherulitic zones has a very pronounced strengthening effect.

A molded product of crystalline thermoplastic material, when subjected to excessive mechanical stress, will be fractured always along a line between spherulitic particles, this line being defined as the interspherulitic zone. As a result, reinforcing elements of fibrous or analogous structure, which are located precisely in this critical zone, will increase the mechanical strength to a remarkable degree. The effect of strengthening will be still more pronounced in the case of very pure polymers having a high degree of crystallinity, since the interspherolitic zone does contain neither amorphous material nor other impurities or additives.

The migration of the reinforcing elements during crystallization is improved by the following factors:
Low speed of recrystallization.
Small dimensions of the particles of the reinforcing elements.
Low quantity of reinforcing elements.
Low viscosity of the medium.
Low affinity of the surfaces between the reinforcing elements and the plastic material.

The reinforcing elements can be of very diverse nature, but must have the following characteristics:
1 — Their mechanical strength must be higher than that of the thermoplastic material which is in the interspherulitic zone.
2 — Their melting point, that is the point of recrystallization, must be higher than the unmolding temperature of the thermoplastic material.
3 — The reinforcing elements must be chemically stable at a temperature higher than the maximum molding temperature.
4 — Their shape (fibres, needles, bars, blades, spheres) must favour the transfer of mechanical stresses.
5 — The boundaries of the particles must be sufficiently clearly defined so that these particles can be moved by the growing front of crystallization of the spherulites
6 — The adherence between their surfaces and the plastic material in the interspherulitic zone must permit the transfer of the mechanical stresses without risk of rupture (intercrystalline microcracks).
7 — Their solubility in the solid plastic material must be very low.

Figure 2:
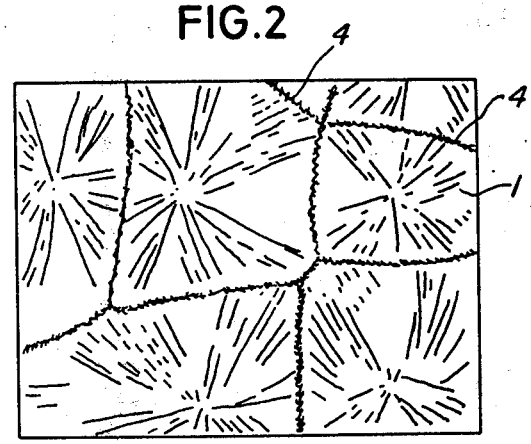

Referring to the accompanying drawing,
FIG. 1 is a diagrammatic micrographic representation of pure crystalline polyamide without the reinforcing elements according to the invention.
FIG. 2 is a diagrammatic micrographic representation similar to FIG. 1 but having reinforcing elements in the interspherulitic zones.

With reference to the drawings, FIG. 1 illustrates the plural crystallites 1 of a polyamide plastic material which has interspherulitic zones 2. The crystallites 1 are directly adjacent one another with the zones 2 merely being defined by direct engagement of the crystallites, there being some spaces 3 but absent any reinforcing material.

In FIG. 2, reinforcing elements 4 have been added in accordance with the invention, these reinforcing elements 4 being in the interspherulitic zones and comprising fibrous or other clearly, structurally, well defined particles.

Examples of carrying out the method according to the invention are given hereafter:

EXAMPLE 1

In a drum-mixer, a polyamide 6.6 powder having a maximum grain or particle size of 0.2 mm is thoroughly mixed with 0.2% by weight of finely divided asbestos. The asbestos is prepared with pure Chrysotile of Arizona, which has been washed, conditioned and selected by the floatation process so as to extract therefrom very fine fibres about 0.4 to $0.6\mu$ in diameter and a length of 4 to $8\mu$. This mixture is then hot granulated in an extrusion mixer.

EXAMPLE 2

A copolymer of polyoxymethylene in powdered form, non stabilized, and produced by polymerization after washing, drying and thermal conditioning, is thoroughly mixed with 0.15% of calcium carbonate in the form of Aragonite. The calcium carbonate is in the form of needles having a width of 0.2 to $0.6\mu$ and a particle length of 2 to $6\mu$. To this mixture, the usual additives are added and the mixture thus obtained is granulated.

EXAMPLE 3

A pure acetylated polyoxymethylene homopolymer is prepared in the form of a fine powder is prepared by cooling a hot solution so as to obtain a completely crystalline product. To this product is added .18% by weight of calcium $\beta$-silicate in the form of fine needles of Wollastonite with a particle width of 0.8 to $1.2\mu$ and a particle length of 5 to $12\mu$. The mixture is mixed with acetone to form a paste which then is dryed. The mixture thus prepared is molded by sintering.

EXAMPLE 4

A spherulitic powder of polyamide 6, prepared by slow cooling of a hot solution is mixed thoroughly with 0.1% by weight of potassium titanate in the form of very fine needles having a particular width of 0.8 to $1\mu$ and a particle length of 4 to $6\mu$. This mixture is molded by sintering at a temperature of 205 to 210° C.

In one mode of carrying out the present method, the reinforcing elements have a point of recrystallization at the same level, or at a level slightly lower, than that of the basic plastic material. Such a composition has, at the molten condition, a much higher fluidity than a material containing a solid and unmelted reinforcing elements. The injection machine can then be used at substantially lower temperatures so that the risk of thermal degradation and transformation of phases, in case of polymorphism of the thermoplastic material, is reduced.

The injection of plastic material such as those available on the market reinforced with glass fibers must be made at a higher temperature than for the same material which is reinforced not. A good fluidity is particularly important in precision micromolding and for the molding of any complex products needing long flowing pipes.

The present method, carried out as indicated hereabove, gives the following advantages:

1 — The molding can be carried out at a temperature substantially lower than is required with the pure plastic material.

2 — The material flows easily and this permits a more perfect filling of the entirety of the mold.

3 — The formation of a spherulitic structure of the plastic material during the cooling in the mold, begins at the same time as the formation of the reinforcing crystals.

4 — The volumetric mass of the reinforcing crystals is much less than that of the crystals of the plastic material. Consequently, the reinforcing crystals are pushed by the front of crystallization of the spherulitic until they are finally driven back into the interspherulitic zones until the crystallization of the two materials comes is complete.

5 — In the case where the point of recrystallization of the reinforcing elements is situated below the recrystallization point of the plastic material, the formation of the reinforcing elements occurs in situ, that is to say in the interspherulitic zones. The elements 4, say in the shape of needles, bars or small blades, etc. can then be of larger dimension since it is no longer necessary that they be displaced by the front of crystallization of the spherulites of the plastic material.

EXAMPLE 5

A copolymer of polyoxymethylene, with a point of recrystallization of 145° C, in the form of a powder, not stabilized, is mixed with a solution of acetone containing 2.5% of N-phenylurea (melting point 148° C). This mixture is dryed in a distiller-mixer and granulated for use in injection molding.

EXAMPLE 6

A pure polyamide 6 powder, with a recrystallization point of 189.7° C, is mixed with an aqueous suspension nickel 0.2% of diacetyldioxime (melting point 185° C). The mixture is dryed in a heating agitator, then granulated.

EXAMPLE 7

The same polyamide as in Example 6 is mixed with pure phenazine in acetone solution. The phenazine is added in an amount of 0.25% by weight. The mixture, after elimination of the acetone, is granulated.

A second mode of carrying out the present method comprises the application of reinforcing elements having a complete or partial solubility in the molten plastic material. During the injection, the mixture is in the condition of an homogeneous solution. During the decrease of the temperature, the condition of sursaturation produces the precipitation of the reinforcing elements, which is the dissolved phase, to form crystals. The plastic material is crystallized by cooling the solution or, according to the metallographic terminology, of a precipitation at the limits of the grains or particles.

In order to improve the solubility of the molten plastic material, suitable additives can be introduced. For example, the viscosity, and hence the fluidity, of the mass to be injected, can be significantly decreased, thus allowing the injection to take place at temperatures substantially lower with the same melt index. This protects the plastic material from the effects of the degradation and, in some cases, from the effects of the transformation of crystalline phases.

Suitable fluidizing and solubilizing additives for plastic materials, particularly for polyamides or polaycetals include for example:
Esters of benzoic acid,
Phenols and polyphenols,
Sulfamides,
Esters of pentaerythritol,
Esters of tetrahydrofurfurylic alcohol,
Polyethers of glycol or polyglycols,
Esters of sebacinic acid and
Amines of $C_8$ to $C_{18}$ hydrocarbons.

Moreover, these additives favor the crystallization of the plastic material by their fluidizing effect. The diffusion is considerably improved and the speed of crystallization increased.

Examples of the use of reinforcing elements having complete or partial solubility in the molten plastic material are:

EXAMPLE 8

A polyamide 6 in powder form, prepared by grinding and sieving, is mixed with a solution of acetone containing 0.3% by weight of pure 1,7-dioxynapthalene. This mixture is dryed in a distiller-agitator, then granulated.

EXAMPLE 9

An homopolymeric polyoxymethylene prepared as in Example 3 is mixed with an acetone solution 0.4% of pure p,p'-dihydroxy-diphenylpropane. This mixture is dryed, then granulated and molded by sintering.

EXAMPLE 10

A copolymer of polyoxymethylene is mixed with an acetone solution containing 0.15% of α-benzoinoxime and 0.4% of resorcinol. This mixture is dryed, then granulated.

According to a third mode of carrying out the present invention, the reinforcing elements crystallize on an insoluble support. This support can also function as a reinforcing element.

The reinforcing elements in this mode are obtained by epitaxial crystallization on a support which is insoluble and unmeltable under the moulding conditions employed. This support must have an epitaxial activity towards the reinforcing elements. For example, the reinforcing elements in the form of needles will fix themselves to the surface of the support. In this way, structures of needles arranged along the ray of a sphere, that is to say reinforcing spherulites, will be obtained. If these spherulites are sufficiently small, they will go into the interspherulitic zones of the plastic material.

Such reinforcing spherulites, bristled with crystalline needles, can also be prepared separately and introduced into the plastic material as an unmeltable and insoluble reinforcing additive. In this case, their melting point will be higher than the maximum temperature reached during the molding process.

The three modes of carrying out the present method which have been disclosed hereabove, as well as these ones of the examples 5 to 10, allow for thermal recrystallization of the reinforcing elements after moulding. It is consequently possible to choose a composition particularly suitable to thermal treatment, the hardness can be influenced either throughout the whole product, or only at its surface.

In order to carry out thermal recrystallization of the reinforcing elements, the melting and recrystallization points of the reinforcing elements must be situated at a lower level than the crystalline melting point of the plastic material.

The presence in the interspherulitic zones of plastic material of low molecular weight (crystalline melting point lower that than the plastic material constituting the spherulites), of amorphous material or of fluidizing and solvating additives, favors the recrystallization of the reinforcing elements by thermal post-treatment.

The thermal treatment of such products is comparable to the thermal treatment of metals and their alloys. In this way it is possible to modify the reinforcing elements and thus to adjust the degree of hardness and the degree of flow throughout the molded product or only at its surface.

During injection molding with rapid cycles, the duration of crystallization of the reinforcing elements is often too short to permit optimum development of the reinforcing structure. In such cases, the recrystallization by thermal post-treatment is of advantage.

The term "front of recrystallization" is understood to represent the following condition: During the crystallization of the thermoplastic material from its molten state the crystals are grown and as the crystals get larger the outermost portions thereof comprise "front" of recrystallization. It is the dynamics during recrystallization that orient the reinforcing elements so that as the crystal grows the outermost extent of the crystal pushes the reinforcing elements along therewith so that when the crystallization is complete the reinforcing elements are located at the interspherulitic zones — that is between the fully grown crystals. Each spherulite has its own "front of crystallization" and continues to grow until making contact with adjacent growing spherulites.

What I claim is:

1. A method for manufacturing molded thermoplastic products formed of crystallizable plastic material having reinforcing elements, said method comprising, introducing reinforcement elements to the molten thermoplastic material before crystallization begins, permitting crystallization to occur so that when the individual crystallites of the thermoplastic material have reached their maximum size, the reinforcing elements are arranged in the zone of contact of the crystallites exclusively exterior of the crystallites, said reinforcing elements being capable of being moved by the front of the crystallization during the growth of the crystal and said reinforcing elements
   a. having dimensions smaller than the dimensions of the crystallites of the thermoplastic material,
   b. are present in an amount of from 0.05 to 5% by weight based on the thermoplastic material and
   c. having a shape favorable to the transfer of mechanical stresses,
said reinforcing elements formed of organo-metallic material one of fibrous, needle-shaped, small bladed, prismatic, spherical and bristle particle configuration at least partially soluble in the molten thermoplastic material and an additive is introduced to the reinforcing material which is capable of solublizing same at the molding temperature.

2. The method as claimed in claim 1 particles insoluble and non fusible at the molding temperature are added to the thermoplastic material, said thus mentioned particles favoring the crystallization of the reinforcing elements.

3. The method as claimed in claim 1 in which the thermoplastic material is crystallized to a spherulitic crystalline configuration by a slow cooling of a diluted solution so that the reinforcing elements are disposed in the interspherulitic zones at the termination of crystallite growth.

4. A method for manufacturing molded thermoplastic products formed of crystallizable plastic material having reinforcing elements, said method comprising, introducing reinforcement elements to the molten thermoplastic material before crystallization begins, permitting crystallization to occur so that when the individual crystallites of the thermoplastic material have reached their maximum size, the reinforcing elements are arranged in the zone of contact of the crystallites exclusively exterior of the crystallites, said reinforcing elements being capable of being moved by the front of the crystallization during the growth of the crystal and said reinforcing elements
   a. having dimensions smaller than the dimensions of the crystallites of the thermoplastic material,
   b. are present in an amount of from 0.05 to 5% by weight based on the thermoplastic material and
   c. having a shape favorable to the transfer of mechanical stresses
and the step of adding to the molten thermoplastic material, an insoluble support material non-meltable under molding conditions and having epitaxial activity towards the reinforcing elements, the particles of support material being smaller than the crystallites of the thermoplastic material when same are fully grown.

* * * * *